(12) United States Patent
Pulford et al.

(10) Patent No.: US 6,808,579 B1
(45) Date of Patent: Oct. 26, 2004

(54) BONDING ELASTOMERIC ARTICLES

(75) Inventors: Carl Trevor Ross Pulford, Cuyahoga Falls, OH (US); Ran Ding, Hudson, OH (US); Richard Michael D'Sidocky, Ravenna, OH (US); Patrick John Reilly, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/031,500

(22) PCT Filed: Sep. 20, 1999

(86) PCT No.: PCT/US99/21694

§ 371 (c)(1),
(2), (4) Date: Jan. 15, 2002

(87) PCT Pub. No.: WO01/21690

PCT Pub. Date: Mar. 29, 2001

(51) Int. Cl.[7] .......................... B29D 30/56; B32B 31/06
(52) U.S. Cl. ..................... 156/96; 156/123; 156/130.5; 156/306.9
(58) Field of Search ..................... 156/96, 123, 128.1, 156/129, 130, 130.5, 133, 306.6, 306.9, 307.1, 338

(56) References Cited

U.S. PATENT DOCUMENTS

| | | | | |
|---|---|---|---|---|
| 1,434,892 A | * | 11/1922 | Harrison et al. ......... | 156/307.1 |
| 3,136,673 A | * | 6/1964 | Carver ......................... | 156/96 |
| 3,951,720 A | * | 4/1976 | Brodie ......................... | 156/96 |
| 4,149,926 A | * | 4/1979 | Taylor ...................... | 156/406.4 |
| 5,302,150 A | | 4/1994 | Walbeck et al. ............ | 452/138 |

FOREIGN PATENT DOCUMENTS

| | | | | |
|---|---|---|---|---|
| EP | 0795397 | 9/1991 | ........... | B32B/25/00 |
| EP | 0496202 | 7/1992 | ........... | B29B/11/04 |
| EP | 0713896 | 5/1996 | ............. | C08J/3/24 |
| EP | 0445807 | 9/1997 | ........... | B32B/27/26 |

* cited by examiner

*Primary Examiner*—Geoffrey L. Knable
(74) *Attorney, Agent, or Firm*—Nancy T. Krawczyk (57) ABSTRACT

An improved method of bonding at least two cured or uncured elastomeric layers is disclosed. The method comprising placing an uncured elastomeric component (22) between the two elastomeric layers, and curing the elastomeric component to bond the elastomeric layers together. The improvement is characterized by forming the uncured elastomeric component (22) by preparing two non-productive elastomer compounds (10, 12), wherein each non-productive compound (10 or 12) is prepared with a co-reacting agent of a co-reacting cure package not added to the other non-productive compound (12 or 10), and layering the non-productive elastomer compounds (10, 12) in alternating layers with a thickness relative to the diffusion rate of the co-reacting agents in each non-productive elastomeric layer (10, 12) to effect diffusion of the co-reacting cure agents through the adjacent layers.

18 Claims, 7 Drawing Sheets

BONDING ELASTOMERIC ARTICLES

TECHNICAL

The present invention is directed toward curing methods for elastomeric articles. Specifically, the present invention discloses a method of producing faster curing rubber and the application of the faster curing rubber in articles for bonding.

BACKGROUND ART

One of the many conflicting requirements of the rubber industry is for compounds that have a short cure time and a long scorch time. The conflict arises because scorch time cannot be changed independently of cure time; the times increase or decrease together. Conventionally, productive compounds, i.e. compounds that are capable of curing, are made in a Banbury mixer that generates beat in the compound during mixing. The compounds are then stored and subjected to further heat history during shaping of the compound by extrusion or calendering. The extruded or calendered article may be stored prior to application of the article in a larger green rubber article. The formed green article may also be further stored until curing. This entire process requires a certain minimum scorch time.

Reductions in cure times are proportional to increases in cure temperatures; however, reduced cure times can no longer be achieved by merely increasing the temperature of a curing press. Cure presses are conventionally run at the maximum temperature permitted to avoid overcure of the outside of the article while not exceeding any component cure limitations.

To obtain a maximum scorch time for rubbers it is also known to not mix the cure package into the rubber compound until the rubber is to be used. The green rubber, absent a mixed cure package, may be stored indefinitely until it is needed for article manufacturing. When the green rubber is needed, the rubber is mixed in a Banbury with the appropriate cure package.

Another known alternative to extend the shelf life of the green rubber is to split the cure package. EP 496,202 discloses a two component system wherein the curatives are split between the two components. The two components must be masticated in a conventional mixer prior to use to achieve a thorough blend of the curatives and gain a productive compound.

U.S. Pat. No. 5,866,265 discloses a way to prevent scorch during extrusion of rubber microlayer compounds comprised of alternating layers of different rubber composition. The cure package is split in any desired manner between the two different rubber compositions, the different compositions are kept separated in different barrels of the co-extruder until they are layered in the extruder die and the curatives migrate into the adjacent layers.

In order to use faster curing compounds in manufacturing rubber articles, the heat history imposed on productive compounds must be reduced. The present invention is directed toward overcoming the limitations of the prior art and producing even faster curing rubber compounds.

SUMMARY OF THE INVENTION

The present invention is directed to an improved method of bonding at least two cured or uncured elastomeric layers. The method comprising placing an uncured elastomeric component between the two elastomeric layers, and curing the elastomeric component to bond the elastomeric layers together. The improvement is characterized by forming the uncured elastomeric component by preparing two non-productive elastomer compounds, wherein each non-productive compound is prepared with a co-reacting agent of a co-reacting cure package not added to the other non-productive compound, and layering the non-productive elastomer compounds in alternating layers with a thickness relative to the diffusion rate of the co-reacting agents in each non-productive elastomeric layer to effect diffusion of the co-reacting cure agents through the adjacent layers.

In one aspect of the inventive method, the elastomeric achieves ninety percent cure, at a cure temperature of 120° C., in less than 30 minutes.

In another aspect of the disclosed method, the two non-productive compounds forming the uncured elastomeric component are prepared with identical compositions except for the co-reacting cure agents in each compound.

In another aspect of the disclosed method, the first non-productive compound forming the uncured elastomeric compound is prepared with an absence of any accelerators found in the second non-productive compound and the second non-productive compound is prepared with an absence of any sulfur vulcanizing agent found in the first non-productive compound.

In yet another aspect of the disclosed method, the fist non-productive compound is prepared with 1 to 5 phr zinc oxide and 0 phr sulfur vulcanizing agent and the second non-productive compound is prepared with 0 phr zinc oxide and 0.2 to 8 phr sulfur vulcanizing agent.

In one aspect of the disclosed method of improved bonding, the co-reacting agents of the cure package are selected to produce an ultra fast cure of the elastomeric component.

In another aspect of the disclosed boding method, the adjacent layers of the two non-productives are formed with a thickness equal or less than 2 mm. The layer thickness of the adjacent layers may be identical or may differ, depending upon the desired cure characteristics or the end characteristics of the elastomeric component.

In one aspect of the disclosed method, the two non-productive compounds forming the uncured elastomeric component may be stored for any period of time prior to layering to form the uncured component. In another aspect of the inventive method, the layered component may be stored for any period of time prior to curing the elastomer.

In an aspect of the disclosed method of bonding at least two cured or uncured elastomeric layers, the cured or uncured elastomeric layers are two different components of an article selected from the group consisting of a passenger tire, an extended mobility tire, a truck tire, an earth mover tire, a retreaded tire, a belting, an airspring sleeve, or a rubber track.

In another aspect of the disclosed method, the elastomeric layers to be bonded by means of the uncured elastomeric component are two different tire components. In another aspect of the disclosed method, the two different tire components are a prepared tire casing and a pre-cured tire tread.

In one aspect of the disclosed method of bonding a tire casing and a pre-cured tire tread together by means of the uncured elastomeric component, the uncured elastomeric component is prepared by layering the two non-productive compounds immediately prior to inserting the elastomeric component between the tire casing and the ire tread.

In a further aspect of the disclosed method of retreading a tire, the tire tread is preheated prior to placing the tread on the uncured elastomeric component. In another further aspect of the disclosed retreading method, the layered uncured elastomeric component is cured at room temperature.

BRIEF DESCRIPTION OF DRAWINGS

The invention will be described by way of example and with reference to the accompanying drawings in which.

DETAILED DESCRIPTION OF THE INVENTION

Through experimentation it has been determined that, unlike filler systems used in rubber compounds, curative packages do not need high mixing forces to be distributed within a compound. Key curative chemicals conventionally used in rubber compounds (e.g. sulfur and accelerator) have an inherent solubility in rubber and can be uniformly distributed by diffusion. What is required is that the rubber compound be divided into regions that are small enough for the curves to diffuse through the regions in the time available. The size of the regions is determined by the rate of diffusion in order to obtain a uniform distribution of the curative chemicals. It was discovered that the region size is small and can be preferably achieved by microlayering compounds without any further mastication. The compound may have a split cure package. The present invention is directed toward exploiting this discovery to greatly decrease the cure time of compounds without encountering scorch problems during processing of the compound.

Figure 1:
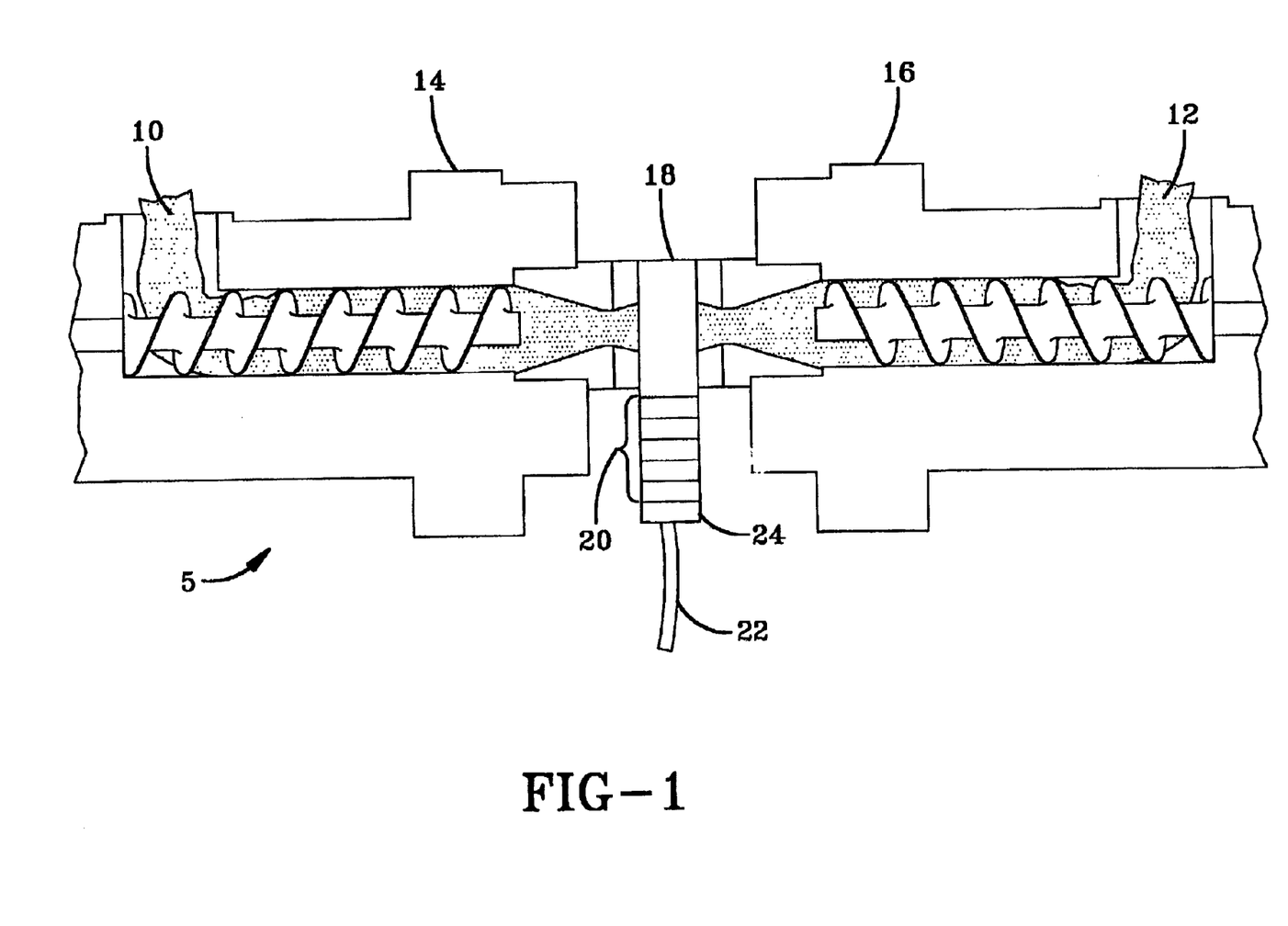
FIG. 1 illustrates microlayering of a compound using a duplex extruder.
Figure 2:
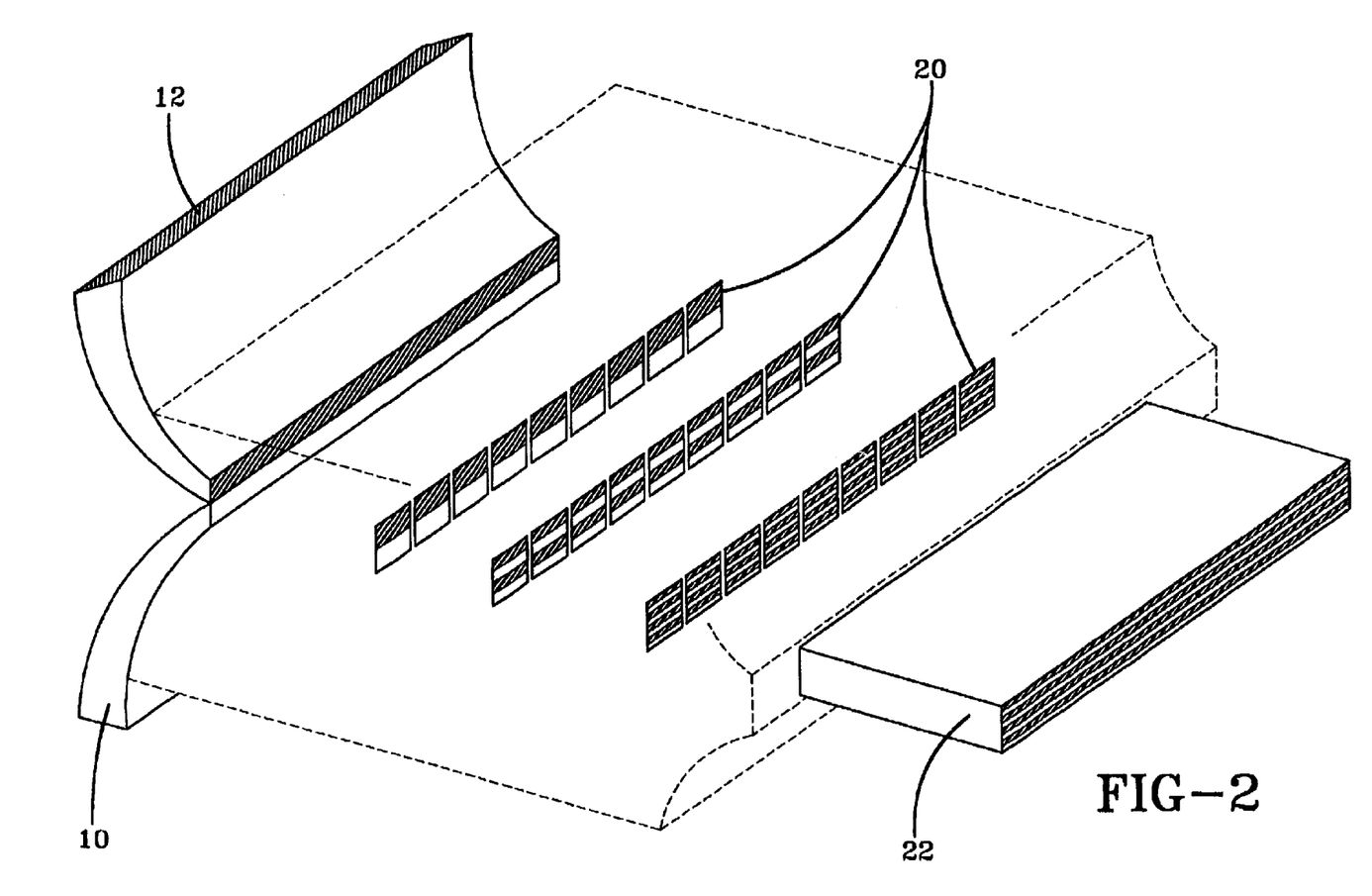
FIG. 2 illustrates the microlayered compound as it passes through a set of microlayering dies.
Figure 3:
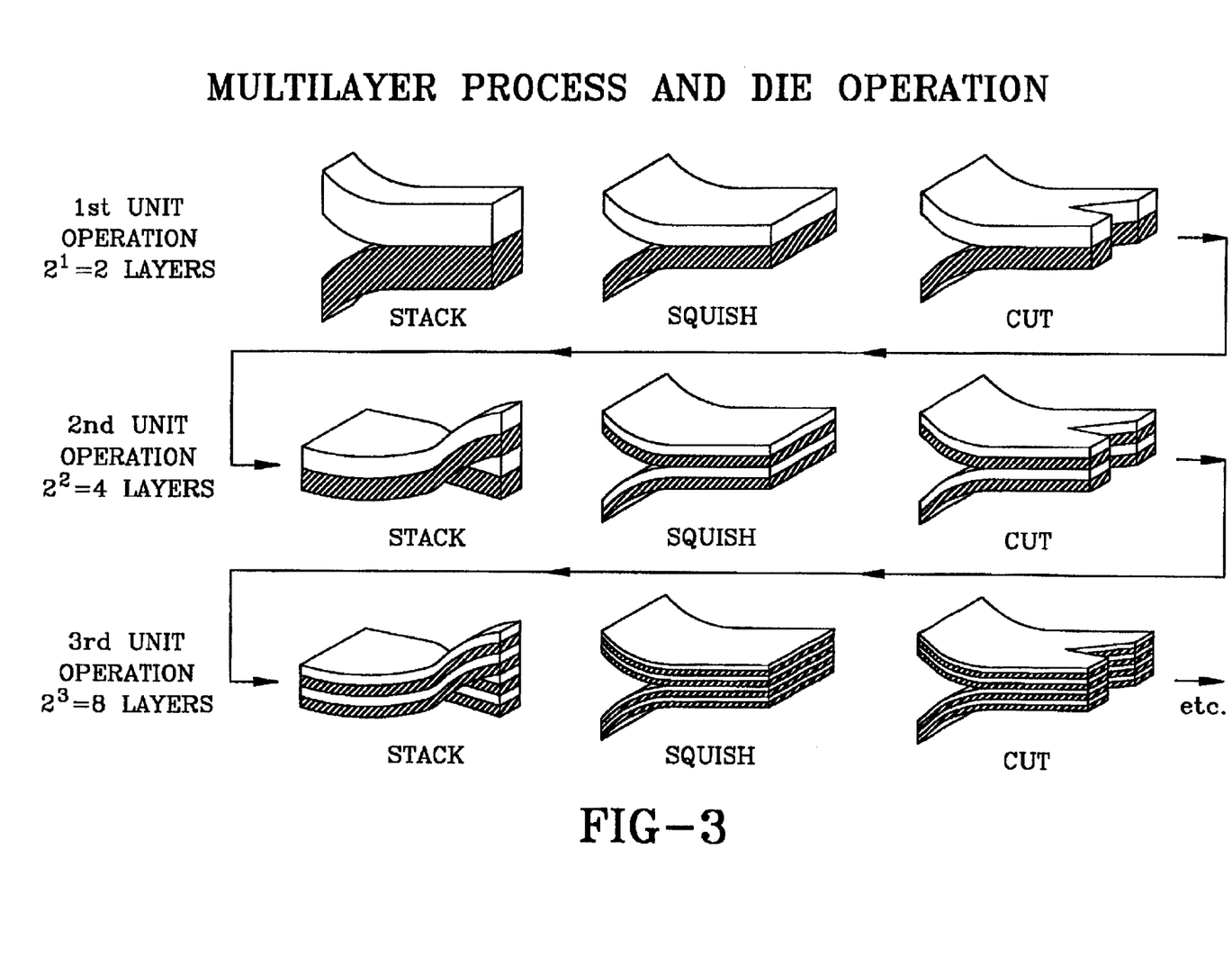
FIG. 3 illustrates a multilayering process.

Microlayering may be achieved by the use of a duplex extruder 5 as illustrated in FIG. 1. The cure package for a reactive compound is split between two non-productives 10, 12 that have an "infinite" scorch time; that is, each non-productive 10, 12 is not capable of curing as compounded. Each non-productive 10, 12 is fed into a separate extruder 14, 16 of the duplex extruder 5. The non-productives 10, 12 are kept separate until the extruder die 18. A bi-layer of the two non-productives 10, 12 is generated inside the extruder die. The bi-layer is then fed through a series of microlayering die inserts 20, each of which doubles the number of layers in the extrudate. FIG. 2 illustrates the effect of feeding the two non-productives 10, 12 through the layering die inserts 20, and FIG. 3 illustrate the principle of the layering dies. A productive compound flows immediately through a shaping die 24 to form a tire component 22.

When the non-productives 10, 12 are layered inside the microlayering die inserts 20, the compounds are hot and therefore the rate of interdiffusion of the curatives may be fast. When interdiffusion beings to occur in the microlayering die inserts 20, an "in-situ" productive compound is created.

The curatives should be uniformly distributed throughout the in-situ productive compound so that the physical properties do not vary within the cured component. As the thickness of the adjacent layers is dependant upon the diffusion rate of the selected cure components in the cure package, the layer thickness in the microlayers should be sufficient to result in diffusion of the curatives through at least the adjacent layers. If the layers are too thick relative to the diffusion and cure rate, then curing may occur only at the layer boundaries. As the layer thickness decreases, the curatives diffuse through the layers more quickly and achieving greater uniformity in the curative distribution. The thickness of the microlayers can by changed by varying the number of layering die inserts 20; layer thickness decreases with an increased number of die inserts 20. The number of layers is determined by the formula $N=2\times2^n$, where N equals the number of layers and n equals the number of die inserts. Preferably, the layer thickness should be about 2 mm or less to achieve the desired diffusion uniformity; however, given the variations in cure packages and diffusion rates of cure packages, the thickness may be greater.

The heat history seen by the in-situ productive compound is much less than that seen by conventionally processed compounds. The effective heat history seen by the in-situ compound occurs during its passage through the microlayer die insert 20; any heat history seen by the non-productives 10, 12 during the mixing of the individual non-productives 10, 12 is irrelevant to the heat history of the in-situ productive compound. Therefore less scorch time can be tolerated.

For use in making in-situ productives 22, the use of the microlayer die inserts 20 and a profiling extruder results in the integration of static layering and profiling of a green rubber component. This integration allows for the creation of components of unprecedented faster curing properties, as further discussed below.

The microlayers may also be formed in a number of other ways than with the disclosed microlayer die inserts 20. Another method of co-extruding multilayer laminates is described in U.S. Pat. No. 3,557,165. Although extruders are a preferred means of preparing composites with large numbers of very thin layers (e.g. more than 10,000 layers/25.4 mm), other less elaborate means of preparing thin multilayers are also possible. A calender can be used to prepare thin sheets of polymeric material that can subsequently be plied up in alternating layers and possibly further thinned by application of pressure. By repeated plying and thinning, composites with several hundred layers per inch can be readily prepared.

Alternatively the small diffusion regions required for diffusion of the cure package may also be, created by introducing the two non-productives 10, 12 in a duplex extruder with a static mixer type insert at the location where the two non-productives 10, 12 contact. The sole requirement, in accordance with the present invention is that the two non-productives 10, 12, after coming into contact, are reduced in size to the needed diffusion region size. Thus the defined layering of the invention can be accomplished by any alternating placement of non-productives 10, 12 so that the non-productives 10, 12 are in a contacting relationship to permit diffusion of the cure package. When placing the non-productives 10, 12 in a layering relationship, the non-productives 10, 12 may be configured as sheets, sticks, rods, strands, planks, or similar configurations.

Each non-productive 10, 12 is comprised of a rubber compound. Representative rubbers that may be used in the rubber compound include acrylonitrile/diene copolymers, natural rubber, halogenated butyl rubber, butyl rubber, cis-1,4-polyisoprene, styrene-butadiene copolymers, cis-1,4- polybutadiene, styrene-isoprene-butadiene terpolymers ethylene-propylene terpolymers, also known as ethylene/propylene/diene monomer (EPDM), and in particular ethylene/propylene/dicyclopentadiene terpolymers. Mixtures of the above rubbers may be used. Each rubber layer may be comprised of the same rubber composition or alternating layers may be of different rubber composition.

The rubber compound may contain a platy filler. Representative examples of platy fillers include talc, clay, mica and mixture thereof. When used, the amount of platy filler ranges from about 25 to 150 parts per 100 parts by weight of rubber (hereinafter referred to as phr). Preferably, the level of platy filler in the rubber compound ranges from about 30 to about 75 phr.

The various rubber compositions may be compounded with conventional rubber compounding ingredients. Conventional ingredients commonly used include carbon black, silica, coupling agents, tackifier resins, processing aids, antioxidants, antiozonants, stearic acid, activators, waxes, oils, sulfur vulcanizing agents and pepping agents. As known to those skilled in the art, depending on the desired degree of abrasion resistance, and other properties, certain additives mentioned above are commonly used in conventional amounts. Typical additions of carbon black comprise from about 10 to 150 parts by weight of rubber, preferably 50 to 100 phr. Typical amounts of silica range from 10 to 250 parts by weight, preferably 30 to 80 parts by weight and blends of silica and carbon black are also included. Typical amounts of tackifier resins comprise from about 2 to 10 phr. Typical amounts of processing aids comprise 1 to 5 phr. Typical amounts of antioxidants comprise 1 to 10 phr. Typical amounts of antiozonants comprise 1 to 10 phr. Typical amounts of steric acid comprise 0.50 to about 3 phr. Typical amounts of accelerators comprise 1 to 5 phr. Typical amounts of waxes comprise 1 to 5 phr. Typical amounts of oils comprise 2 to 30 phr. Sulfur vulcanizing agents, such as elemental sulfur, amine disulfides, polymeric polysulfides, sulfur olefin adducts, and mixtures thereof, are used in an amount ranging from about 0.2 to 8 phr. Typical amounts of peptizers comprise from about 0.1 to 1 phr.

The key to the in-situ productive is the cure package. What is required is a suitable curative package that can be divided into two non-productives 10, 12 that will yield a faster than conventional cure when the two non-productives are alternately layered in the manner previously described. The split of the cure package may also provide each resulting non-productive with an "infinite" shelf life or the layered component 22 with an "infinite" shelf life if curatives that are insoluble at low tempers are employed. The need for the non-productives to have infinite shelf life is critical for some applications, such as retread cushion gum applications, because each non-productive or the layered component 22 must be ale of being stored for many months prior to use.

The current cure package can be split in a variety of ways depending on scorch safety requirements of the final product. Preferably sulfur will be located in one non-productive and accelerators in the other non-productive. Table 1 shows an example of an ultra-fast curing compound and how it is split into two non-productive compounds. Rubber compound A contains only curatives known not to induce cure in the absence of any cross-linking agents present, such as sulfur. Rubber compound B contains only sulfur, which will not crosslink to any great extent without the presence of the other curatives. Accelerator and sulfur levels were doubled in the split cure non-productives on the anion that during diffusion of the curatives, the active curative intermediates would migrate across the multilayer interface and induce cure, thereby being "diluted" by half.

Certain combinations of sulfur and accelerators located in one non-productive and the remaining accelerators placed in the other non-productive would be permissible depending on the scorch safety requirements needed for final component fabrication. One skilled in the art would know the scorch safety requirements and choose the appropriate combination. For example in Table I, N,N'-diphenylguanidine/2-mercaptobenzothiazole/zinc dibenzyl dithiocarbamate is in compound A and sulfur is in compound B. This is the most advantageous for scorch safety. Other possible splits include the combination of the addition of sulfur/zinc dibenzyl dithiocarbamate in compound B and N,N'-phenylguanidine/2-mercaptobenzothiazole in compound A, the combination of the addition of N,N'-diphenylguanidine/sulfur in B and zinc dibenzyl dithiocarbamate/2-mercaptobenzothiazole in A, the combination of the addition of N,N'-diphenylguanidine/zinc dibenzyl dithiocarbamate/sulfur in B and 2-mercaptobenzothiazole in A, and the combination of the addition of 2-mercaptobenzothiazole/sulfur in B and N,N'-diphenylguanidine/zinc dibenzyl dithiocarbamate in A. Other combinations include the selection of cure agents that are insoluble but become soluble within a trigger range temperature and which will then diffuse into the adjacent layers.

Table 1 shows the ODR cure rheometer data for an exemplary compound. The ultra-fast curing compound has a scorch time of 2.8 min at 120° C. The ultra-fast curing compound was mixed by hand passing the compound through a cold mill as the compound would have scorched if mixed in a Banbury. Neither of the split cure rubber compounds A and B exhibited any cure.

TABLE 1

| | Compound | | |
|---|---|---|---|
| | Ultra-Fast Compound | Rubber Compound A | Rubber Compound B |
| Blend of Rubber & fillers, phr[1] | 171.3 | 171.3 | 171.3 |
| N,N'-phenylguanidine, | 0.5 | 1 | |
| Insoluble sulfur (amorphous sulfur), phr | 2.8 | | 5.6 |
| 2-mercaptobenzo-thiazole, phr | 0.85 | 1.7 | |
| Zinc dibenzyl dithiocarbamate, phr | 1 | 2 | |
| | ODR Rheometer Results 120° C. for 60 minutes | | |
| T90[2] | 15 | no cure | no cure |
| T80[3] | 8 | | |
| T25[4] | 4 | | |
| T(1)[5] | 2.8 | | |

[1]100 phr Natural Rubber and 40 phr carbon black
[2]Time to achieve a 90% cure of the compound
[3]Time to achieve an 80% cure of the compound
[4]Time to achieve a 25% cure of the compound
[5]Scorch time For non-productives requiring an infinite shelf life, the sulfur-donor class of accelerators was excluded because, although they provide for ultra fast curing, they are capable of curing rubber on their own and therefore cannot make an indefinite shelf life non-productive. In other applications of the present invention wherein a long shelf life for the non-productive is not required, such as for new tires, it is understood that other classes of is accelerators could be used. Suitable types of accelerator classes would include amines, aldehyde/amine (condensation reaction products), disulfides, guanidines, thioureas, thiozoles, thiurams, sulfenamides, dithiocarbamates, and xanthates.

For comparison with the hand mixed ultra-fast compound, the split-cure rubber compounds A and B were microlayered together to create several in-situ productives as follows. Productive sheets, about 7 inches (about 178 mm) wide and ⅛ inches (3.175 mm) thick, were made containing 8 and 32 alternating horizontal layers of the split-cure nonproductives. The thickness of the layers of split cure nonproductives in the productive sheets was therefore 0.015 inches (0.4 mm) and 0.004 inches (0.1 mm) respectively. For the 8-layer sheets, the die set temperature was 210° F. For the 32-layer sheets, die temperatures of 210° F. and 270° F. were used. The duplex extruder screws were both run at 10 RPM in order to obtain a productive with a 50/50 composition of the two split-cure non-productives, Compound A and B. The sheets obtained at the 210° F. die set temperature buckled due to unequal shrinkage, but at the 270° F. die temperature, the nerve was reduced and smooth sheets were obtained. Signs of scorch were not seen in any of the sheets.

Samples of the sheet were cut and immediately quenched in ice water to stop any cure that might have begun and the samples were tested using cure rheometers. Multiple samples were taken during each extrusion condition, in order to assess the uniformity of cure during a run of the extruder.

In preparing the productive compound using the previously discussed microlayering die inserts 20, the minimum number of layering inserts required to give a uniform dispersion of curves should be employed since the extruder head pressure increases with the number of inserts.

Figure 4:
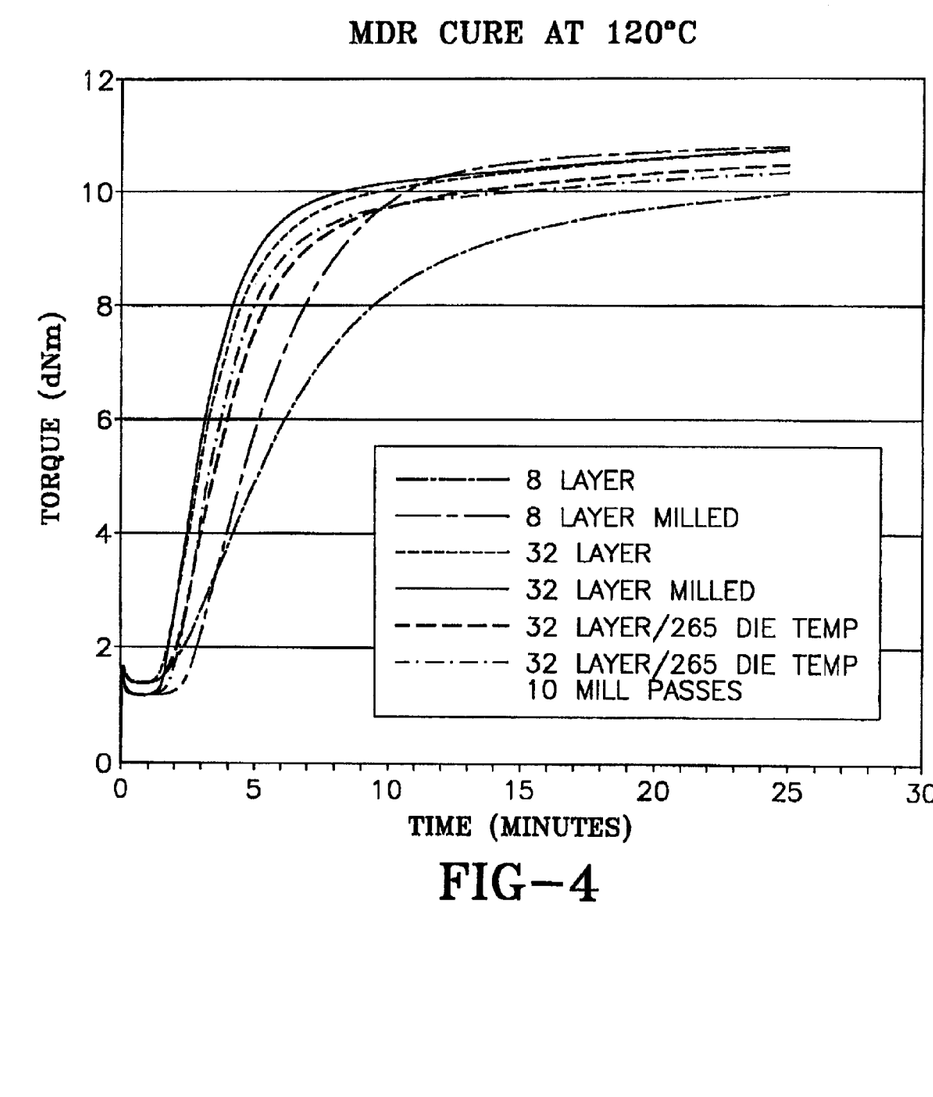
FIG. 4 is a chart showing the MDR cure curves at 120° C. for a series of layered rubber sheets.
Figure 5:
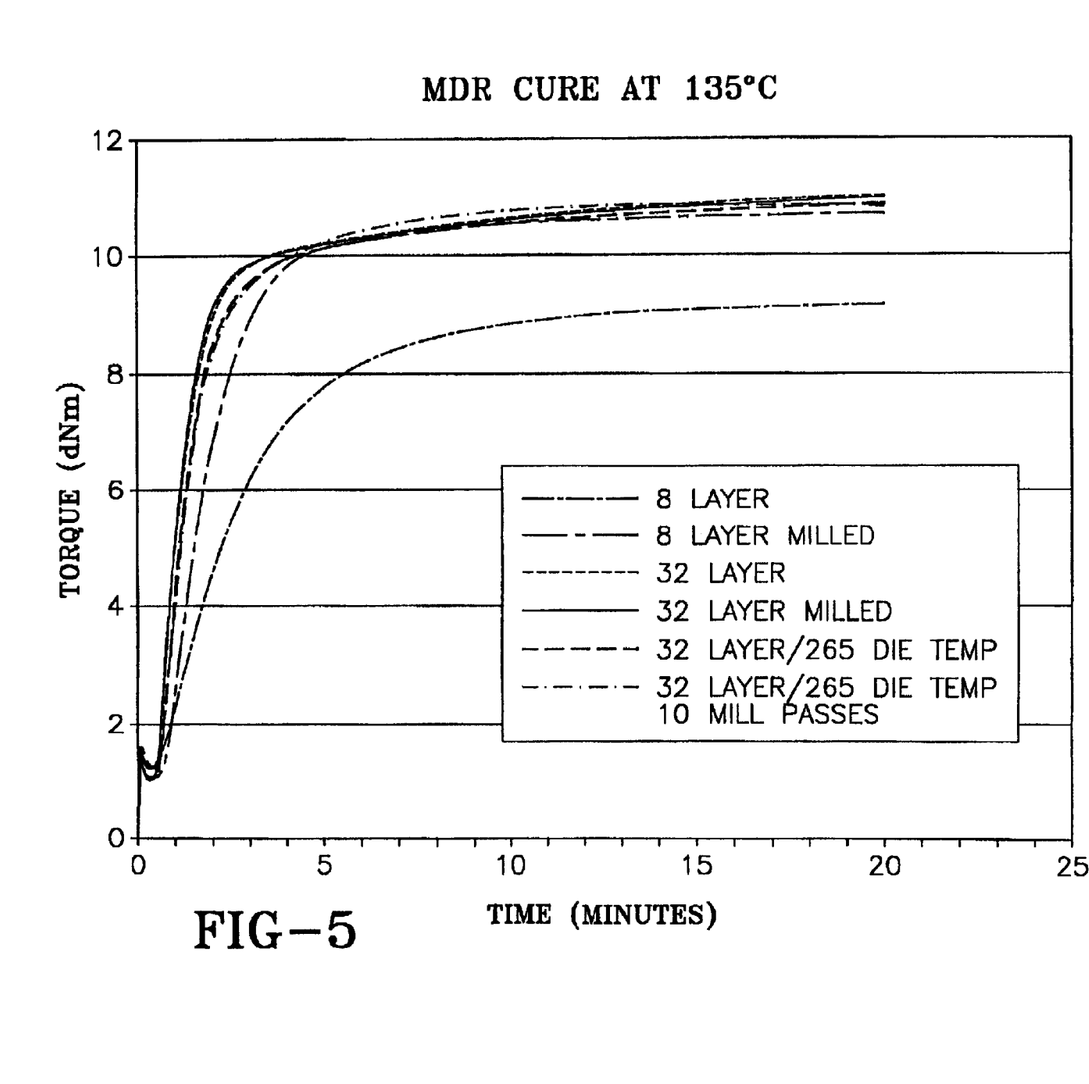
FIG. 5 is a chart showing the MDR cure curves at 135° C. for a series of layered rubber sheets.

As a benchmark, samples of the 8-layer and 32-layer sheets were passed through a cold mill ten times by hand without banding, in order ensure complete dispersion of the curatives. These samples represent the final, "equilibrium" state of curative dispersion. The cure rheometer curves of the microlayered stocks and those that had been milled were measured at two temperatures, 120 C. ° and at 135 C. °, using both ODR and MDR cure rheometers. Graphs of the MDR cure curves are illustrated in FIGS. 4 and 5; the cure information is also set forth in Table 2.

Cure properties were determined using a Monsanto oscillating disc rheometer which was operated at temperatures of 120° C. and 135° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

The cure time of the productive sheets was exceptionally short. The 32-layer sheet has a ninety percent cure (T90), at 135° C., of 4 minutes. At 120 C. °, the ODR cure time was typically 10.5 min for the 32-layer sheet, longer than the cure at 135° C. as would be expected. The scorch time of the 32-layer sheet was about 3 minutes. The conventional process of Banbury mixing followed by calendering could not be used to make this sheet, as the sheet would scorch. This cure time is exceptionally short compared to conventional elastomeric compounds. Conventional rubber compounds have an average T90 of 30 minutes at 120° C., or an average T90 of about 10–20 minutes at 150° C.

The cure time of the compound when prepared as a 32-layered sheet is less than when the compound is prepared by hand milling, see Tables 1 and 2; the cure time is reduced from 15 minutes to about 10 minutes, a ⅓ reduction in cure time. However, the scorch time of the compound stayed substantially the same; when prepared by hand mill, T(1) was 2.8 minutes, when prepared by layering, average T(1) was 2.87 minutes.

What this indicates is that by processing the compound in a multi-layering process using a split cure package, the time to cure rubber compounds can be significantly reduced, and a desirable scorch time may be maintained. Thus the goal of achieving a fast curing elastomeric compound is achieved by microlayering the two non-productives in the manner described. The durable goal of achieving a faster cure at a lower curing temperature is also achieved. As cure times decrease with increased cure temperature, were the above microlayered compound cured at the conventional curing temperature of 150° C., cure times would be almost instantaneous, faster than the conventional cure times of 10–20 minutes at 150° C.

TABLE 2

|  | ODR Cure Rheometer Data | | | MDR Cure Rheometer Data | | |
| --- | --- | --- | --- | --- | --- | --- |
| Condition | Scorch time at 120° C. (min)[1] | T90 at 120° C. (min)[2] | T90 at 135° C. (min)[3] | Scorch Time at 120° C. (min)[1] | T90 at 120° C. (min)[2] | T90 at 135° C. (min)[3] |
| 8-layer Sheet | 3.3 +/− 0.3 | 15.3 +/− 2.5 | 5.65 +/− 0.6 | 3.6 +/− 0.22 | 18.09 +/− 1.2 | 7.22 +/− 1.0 |
| 8-layer Sheet - 10 mill passes | 2.5 +/− 0 | 10.5 +/− 0 | 4.8 +/− 0 | 3.5 | 12.17 | 3.97 |
| 32 layer sheet | 2.9 +/− 0.14 | 10.5 +/− 0 | 4.8 +/− 0 |  |  |  |
| 32 layer sheet - die temp 210° F. |  |  |  | 2.285 +/− 0.02 | 15.99 +/− 0.18 | 4.98 +/− 0 |
| 32 layer sheet - die temp 210° F. - 10 mill passes |  |  |  | 2.2 | 15.8 | 4.77 |
| 32-layer sheet - die temp 270° F. | 2.85 +/− 0.5 | 10.25 +/− 0.35 | 3.5 +/− 0.25 | 2.73 +/− 0 | 15.95 +/− 0.45 | 4.71 +/− 0.22 |
| 32-layer sheet - die temp 270° F. - 10 mill passes | 3.3 +/− 0 | 10.5 +/− 0 | — | 2.62 | 15.45 | 4.08 |

[1]Time to achieve 1% cure of the compound; i.e. T(1)
[2]Time to achieve 90% cure of the compound at a cure temperature of 120° C.
[3]Time to achieve 90% cure of the compound at a cure temperature of 135° C.

The 120 C. ° ODR cure rheometer curves of 32-layer samples taken throughout the run superposed on each other suggests that the composition of the cure package created in the microlayer extruder was very consistent. Also, the ODR and MDR cure results indicate that the curatives diffuse between the microlayers to create an in-situ productive. The diffusion of the curatives is complete in the 32 layer sheets, as indicated by the identical cure curves of the 32-layer sheet and the milled 32-layer sample (where the distribution of curatives is uniform). In contrast, tile diffusion process is not complete in the 8-layer sheet as indicated by the longer cure time that is longer than for the 32-layer sheet and is shortened by milling. The cure time of the milled 8-layer sheet is identical to the unmilled 32-layer sheet; this is again consistent with the 32-layer sheet having the equilibrium distribution of curatives. The results indicate that the microlayer thickness of 0.004 inches (0.1 mm) is small enough for complete interdiffusion of these particular curatives to occur in this rubber blend, but that 0.015 inches (0.4 mm) is not thin enough for the exemplary cure package containing insoluble sulfur. As previously discussed, the thickness of the layers is dependent upon the diffusion rate of the curatives, and will vary with different cure packages.

The degree of cure of the microlayered, in-situ productive with a layer thickness about 0.1 mm is very close to that of the ultra-fast compound of Table 1. This indicates that the microlayering process for creating in-situ productive delivers the same cured compound as the hand pass/cold mill process. The above results also indicate that splitting the cure package and extruding the compound in the microlayering process can reduce the cure time and temperature of conventional compounds.

Also, these results point to the ability to produce faster curing "infinite" shelf life components. As disclosed, one constituent of the split cure package may be of the type that is insoluble at standard mixing temperatures but changes into a soluble constituent when heated to a temperature within a trigger temperature range; the trigger temperature range is dependent upon different factors such as the curatives used, and any cure intermediates created. In preparing an "infinite" shelf life component 22, one of the non-productives 10 or 12 is prepared with an insoluble curative constituent and the other non-productive 12 of 10 is prepared with the co-reacting curative. The non-productives 10, 12 are microlayered in the manner disclosed above, and may be extruded into a shaped component 22. Since neither the non-productives 10, 12 nor the microlayered component 22 have been subjected to a temperature sufficient to convert the insoluble curative capable of beginning to diffuse through the layers, the microlayered component 22 does not begin curing and has an "infinite" shelf life. When it is desired to use the microlayered component 22, the component 22 is then subjected to a temperature within the trigger temperature range sufficient to convert the curative to a diffusable state and begin cure of the component. Due to the faster cure chemistry of the then soluble cure agents, the component 22 will cure at a faster rate then is conventionally seen in the compound.

Production of a conventional compound in the disclosed multilayering process may be used in multiple applications in the compound and rubber industry. Notably, due to the faster curing of the multi-layered composite formed, the composite may be used as an adhesive bonding layer between other elastomeric layers, as an inner component of a large elastomeric article, or as a patch for elastomeric articles.

Figure 6:
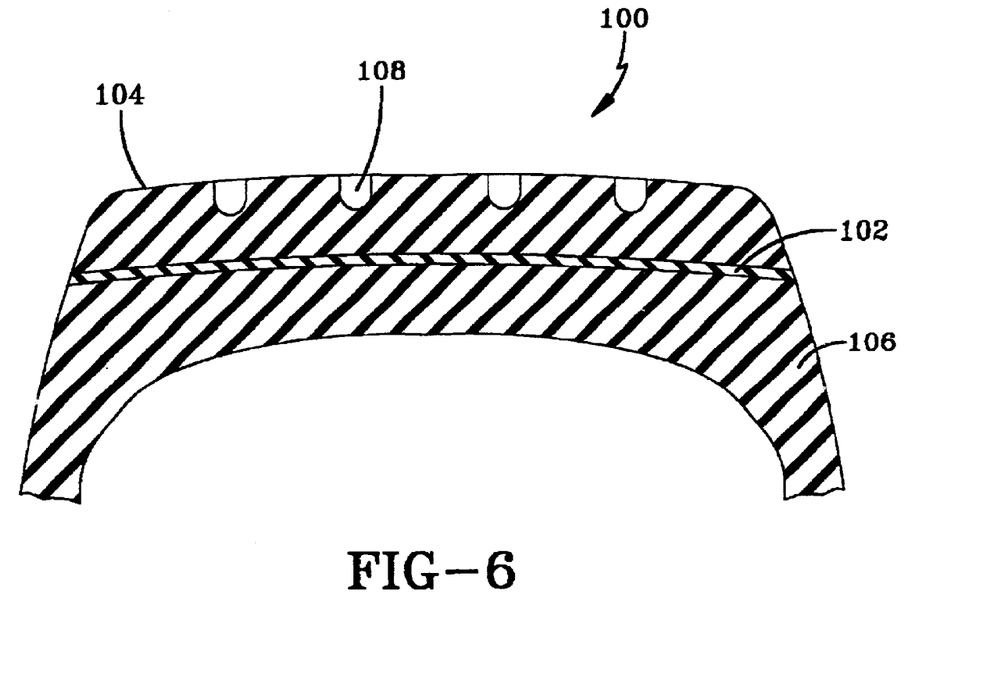
FIG. 6 illustrates a retreaded tire.

One specific application for the in-situ productive is tire retreading. FIG. 6 illustrates a tire 100 after retreading. In the retreaded tire 100, a cushion gum 102 is used as the "adhesive" which holds the precured tread 104 onto the buffed carcass 106. The precured tread may be defined by any combination of horizontal or lateral grooves 108. Conventionally, the cushion gum 102 is mixed in a centralized plant and shipped in refrigerated trucks to small retreading shops, where it is stored for a period of time. The cushion gum 102 must have a shelf life of at least several months. The cushion gum 102 is applied to the buffed carcass 106 followed by the pre-cured tread 104 and the tire 100 is placed in an autoclave to cure the cushion gum 102. In this process, for each retreading of the tire, the carcass 106 is subjected to an additional heating cycle. If the cure time could be reduced, the durability of the carcass 106 may be improved, as well as permitting carcasses 106 to be retreaded multiple times before the useful life of the carcass 106 is reached.

Figure 7:
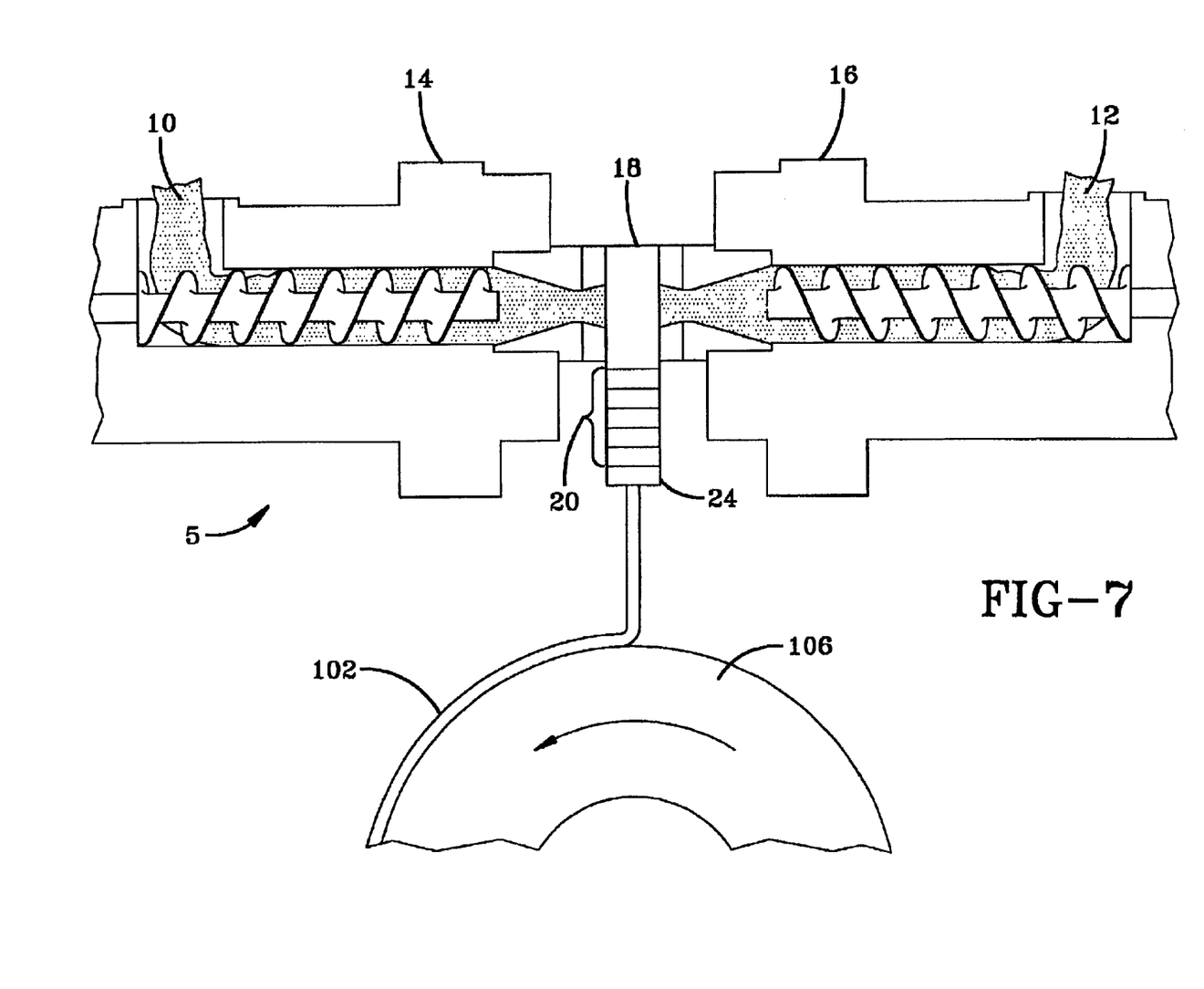
FIG. 7 illustrates the inventive process of retreading a tire.

By using the inventive in-situ productive as the cushion gum, a fast curing, low temperature cushion gum 102 can be created at the moment of retreading by extruding the cushion gum 102 directly onto the buffed carcass 106 as the carcass 106 is rotated beneath the duplex extruder 5, as illustrated in FIG. 7. After the cushion gum 102 and the pre-cured tread 104 are placed on the buffed carcass 106, the tire 100 is then vulcanized. Due to the reduced cure time of the in-situ productive compound forming the cushion gum 102, the vulcanization time of the tire 100 is reduced from conventional lengthier cure times; alternatively, the temperature used to cure the leaded tire can be reduced from the conventional temperature. To further reduce cure times, the precured tread 104 can be pre-warmed prior to application on the carcass 106 so that the residual beat in the pre-warmed tread 104 might either give the cure a boost or generate the cure of the gum layer 102. The use of the productive compound, and the resulting faster cure times, along with a pre-warmed tread 104 and carcass 106 may allow a lower temperature cure, and may approximate a room temperature cure, that is, the retreaded tire need not be placed in an autoclave to complete the cure of the gum layer 102, thereby further improving the durability of the carcass 106 of the retreaded tire 100. The use of ultra-fast cure packages in the cushion gum 102 as disclosed above will further reduce cure times and temperatures.

Alternately, the cushion gum 102 may be prepared with a non-productive comprising a non-soluble cure component as discussed above. The non-curing microlayered cushion gum 102 may be prepared at any time prior to application to the buffed carcass 106. After application of the cushion gum 102 to the carcass 106, the tire tread 104 is applied and then the prepared tire is subjected to a faster cure cycle. The tread 104 may also be preheated to initiate the needed temperature in the cushion gum 102.

Other applications for the in-situ productive compound include the use of in-situ compounding for key components of large rubber articles, such as belting including conveyor belting, airsprings, rubber tracks, passenger tires, truck tires, agricultural tires, large earth moving tires or extended mobility tires which require thick sidewall inserts. The in-situ compound is particularly useful for articles wherein the cure time of the article is determined by the cure rate at the "point of least cure." For new tires, the use of in-situ productives for internal components which determine the cure time of the tire (e.g. EMT insert, apex, shoulder wedge) might remove this bottleneck to reduce cure times and increase productivity.

When using the in-situ productive as a thick article or in a thick article, it may also be desired to match the cure kinetics with the temperature/time history to be seen at each and every location in the curing of the thick part i.e. tailoring the cure kinetics; thereby providing a uniform degree of cure throughout the thick article. Tailoring of the cure kinetics of the in-situ productive in thick articles, which are built up by winding strips of rubber compound, may be achieved by abusing the screw speed of the two extruders 10, 12 relative to each other during the wind of the productive 22. The variance of the screw speeds may be synchronized with the thickness of the productive 22, or the thickness of the article that is being built up with the extruded productive 22. Varying the screw speeds results in each non-productive having a different layer thickness. Tailoring of the cure kinetics is useful in manufacturing such articles as heavy tires such as off the road, agricultural, and industrial tires as well as thick engineered products such as heavy conveyor belting and rubber bridge bearings.

Another embodiment to obtain a more uniform and rapid cure in articles which are made from extruding thick profiles rather than being built-up by winding strips would be to use triplex or quadraplex extruders wherein three or four extruders feed the same head and die system. One extruder would deliver a conventional, slow-curing compound, which would pass through a conventional insert and die system. This compound would occupy the region of the profile that would be in contact with the hot mold during curing. The other extruders would deliver split-cure compounds, which would be combined in a microlayer or static mixer die insert to form fast-curing productives. These would occupy the region of the profile that will be away from the hot mold. The resulting profile (e.g. tire tread or sidewall) would have a tailored cure rate, which varies from slow, where it contacts the hot mold, to very fist in regions furthest from the hot mold.

Those skilled in the art would readily appreciate that the applicability of in-situ productive technology in other related fields, wherever faster cure times are desired and are currently limited by the conventional technology.

What is claimed is:

1. A method of bonding at least two cured elastomeric layers, the method comprising placing an uncured elastomeric component (22) between the two elastomeric layers, and curing the elastomeric component (22) to bond the elastomeric layers together, wherein the method is characterized by forming the uncured elastomeric component (22) by a) preparing two non-productive elastomer compounds (10, 12), wherein each non-productive compound (10, 12) is prepared with a co-reacting agent of a co-reacting cure package not added to the other non-productive compound (10, 12), b) layering the non-productive elastomer compounds (10, 12) in at least eight alternating layers with a thickness relative to the diffusion rate of the co-reacting agents in each non-productive elastomeric layer to effect diffusion of the co-reacting cure agents through the adjacent layers.

2. A method of bonding in accordance with claim 1 wherein the elastomeric component (22) achieves ninety percent cure, at a cure temperature of 120° C., in less than 30 minutes.

3. A method of bonding in accordance with claim 1, wherein the two non-productive compounds (10, 12) are prepared with identical compositions except for the co-reacting cure agents in each compound (10, 12).

4. A method of bonding in accordance with claim 1, wherein each adjacent layer of the uncured elastomeric component (22) is formed with a thickness equal or less than 2 mm.

5. A method of bonding in accordance with claim 1, the two non-productive elastomer compounds (10, 12) being layered with differing thickness.

6. A method of bonding in accordance with claim 1, the method comprising the further step of storing the two non-productive compounds (10, 12) for a period of time prior to layering.

7. A method of bonding in accordance with claim 1, the method comprising the further step of storing the layered uncured elastomeric component (22) for any period of time prior to placing the uncured elastomeric component (22) between the two elastomeric layers.

8. A method of bonding in accordance with claim 1, the first non-productive compound (10 or 12) being formed with an absence of any accelerators found in the second non-productive compound (12 or 10) and the second non-productive compound (12 or 10) being formed with an absence of any sulfur vulcanizing agent found in the first non-productive compound (10 or 12).

9. A method of bonding in accordance with claim 1, the first non-productive compound (10 or 12) being formed with 1 to 5 phr zinc oxide and 0 phr sulfur vulcanizing agent and the second non-productive compound (12 or 10) being formed with 0 phr zinc oxide and 0.2 to 8 phr sulfur vulcanizing agent.

10. A method of bonding in accordance with claim 1, one non-productive elastomer compound (10 or 12) being formed with a sulfur vulcanizing agent that is non-soluble when the two non-productive elastomer compounds (10, 12) are layered and which converts to a diffusable state prior to curing of the layered compound (22).

11. A method of bonding in accordance with claim 1, wherein the at least two elastomeric layers are two different components of an article selected from the group consisting of a passenger tire, an extended mobility tire, a truck tire, an earth mover tire, a retreaded tire, a belting, an airspring sleeve, or a rubber track.

12. A method of bonding in accordance with claim 1, the wherein the at least two elastomeric layers are two different tire components.

13. A method of bonding in accordance with claim 1, wherein the at least two elastomeric layers are a prepared tire carcass (106) and a pre-cured tire tread (104).

14. A method of bonding in accordance with claim 13, the method being characterized by forming the uncured elastomeric component (102) immediately prior to inserting the elastomeric component (102) between the tire carcass (106) and the tire tread (104).

15. A method of bonding in accordance with claim 13, the method being characterized by forming the uncured elastomeric component (102) at any time prior to inserting the elastomeric component (102) between the tire carcass (106) and the tire tread (104).

16. A method of bonding in accordance with claim 13, the method being characterized by the further step of preheating the tire tread (104) prior to placing the tread (104) on the uncured elastomeric component (102).

17. A method of bonding in accordance with claim 13, the method being characterized by curing the elastomeric component (102) at room temperature.

18. A method of bonding in accordance with claim 1, the method being characterized by the co-reacting agents of the cure package being selected to produce an ultra fast cure.

* * * * *